(12) United States Patent
Schaefer et al.

(10) Patent No.: US 11,971,094 B2
(45) Date of Patent: Apr. 30, 2024

(54) DRIVE APPARATUS FOR A VEHICLE

(71) Applicant: AUDI AG, Ingolstadt (DE)

(72) Inventors: Markus Schaefer, Ottobrunn (DE); Moritz Lux, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/781,525

(22) PCT Filed: Sep. 17, 2020

(86) PCT No.: PCT/EP2020/076039
§ 371 (c)(1),
(2) Date: Jun. 1, 2022

(87) PCT Pub. No.: WO2021/110298
PCT Pub. Date: Jun. 10, 2021

(65) Prior Publication Data
US 2023/0003293 A1 Jan. 5, 2023

(30) Foreign Application Priority Data
Dec. 2, 2019 (DE) ...................... 10 2019 132 590.0

(51) Int. Cl.
*F16H 57/04* (2010.01)
*B60K 1/00* (2006.01)
*F16H 57/02* (2012.01)

(52) U.S. Cl.
CPC ............. *F16H 57/043* (2013.01); *B60K 1/00* (2013.01); *F16H 2057/02034* (2013.01)

(58) Field of Classification Search
CPC ........ F16H 57/043; H02K 7/083; H02K 1/32; H02K 5/173
See application file for complete search history.

(56) References Cited

U.S. PATENT DOCUMENTS 6,329,731 B1    12/2001    Arbanas et al.
9,914,349 B2 *   3/2018    Kuroda ................. F16C 35/067
(Continued)

FOREIGN PATENT DOCUMENTS

CN    107580745 A  *  1/2018  ............. F16D 1/101
DE       2354301 A1     10/1973
(Continued)

OTHER PUBLICATIONS

International Search Report (Forms PCT/ISA/206; PCT/ISA/210); dated Jan. 29, 2021 in corresponding PCT Application No. PCT/EP2020/076039 (8 pages) (3 pages English Translation).
(Continued)

*Primary Examiner* — Derek D Knight
(74) *Attorney, Agent, or Firm* — STAAS & HALSEY LLP

(57) ABSTRACT

A drive apparatus for a vehicle having an electric machine whose rotor shaft is constructed as a hollow shaft having an internal tooth arrangement. A gear mechanism drive shaft, which has an external tooth arrangement, is inserted coaxially relative to the hollow shaft into the hollow shaft, to form a torque-transmitting spline. The rotor shaft with a rotor shaft rotary bearing being interposed is guided outward through a bearing opening of an electric machine housing, and the gear mechanism drive shaft has a centering seat which is in abutment with the internal circumference of the rotor shaft with a tight clearance fit. The gear mechanism drive shaft is subjected to bending (D) during travel operation as a result of radially active operating forces ($F_R$). To reduce the bending stress (D), the centering seat of the gear mechanism drive shaft is arranged without an axial offset with respect to the rotor shaft rotary bearing, in axial alignment relative to the rotor shaft rotary bearing.

15 Claims, 4 Drawing Sheets

(56) References Cited

U.S. PATENT DOCUMENTS

| | | |
|---|---|---|
| 2007/0131475 A1 | 6/2007 | Matsubara |
| 2009/0285517 A1 | 11/2009 | Eckel et al. |
| 2017/0067512 A1 | 3/2017 | Nakawatari et al. |
| 2018/0238418 A1* | 8/2018 | Takekawa ............ F16F 15/1201 |
| 2019/0006923 A1 | 1/2019 | Dellal et al. |

FOREIGN PATENT DOCUMENTS

| | | | |
|---|---|---|---|
| DE | 10 2010 050 217 A1 | 11/2010 | |
| DE | 10 2017 123 586 A1 | 4/2019 | |
| DE | 10 2019 132 590.0 | 12/2019 | |
| EP | 1433975 B1 | 11/2010 | |
| JP | 2011-214646 A | 10/2011 | |
| JP | 2015129570 A * | 7/2015 | ............... B60K 7/00 |
| JP | 6588280 B2 | 10/2019 | |
| JP | 2020183769 A * | 11/2020 | ............. F16H 55/06 |
| WO | PCT/EP2020/076039 | 9/2020 | |

OTHER PUBLICATIONS

Notification of Transmittal of Translation of International Preliminary Report on Patentability (Form PCT/IB/338); dated Jun. 16, 2022 in corresponding PCT Application No. PCT/EP2020/076039 (1 page).

International Preliminary Report on Patentability (Form PCT/IB/373); dated May 17, 2022 in corresponding PCT Application No. PCT/EP2020/076039 (1 page).

Written Opinion (Form PCT/ISA/237); dated Jan. 29, 2021 in corresponding PCT Application No. PCT/EP2020/076039 (21 pages).

Examination Report dated Aug. 11, 2020 in corresponding German Patent Application No. 10 2019 132 590.0 (10 pages).

Examination Report dated Sep. 22, 2022 in corresponding European Patent Application No. 20 774 976.3 (5 pages).

* cited by examiner

DRIVE APPARATUS FOR A VEHICLE

CROSS-REFERENCE TO RELATED APPLICATIONS

This application is a U.S. national stage of International Application No. PCT/EP2020/076039, filed on Sep. 17, 2020. The International Application claims the priority benefit of German Application No. 10 2019 132590.0 filed on Dec. 2, 2019. Both the International Application and the German Application are incorporated by reference herein in their entirety.

FIELD

The description below relates to a drive apparatus for a vehicle having an electric machine with a rotor shaft constructed as a hollow shaft in which a gear mechanism drive shaft is inserted and a method for producing a gear mechanism drive shaft in such a drive apparatus.

BACKGROUND

In an electrically operated, two-track vehicle, an electrically driven front axle may, for example, have an electric machine. This electric machine may, where applicable, be arranged axially parallel with the flanged shafts which are guided with respect to the vehicle wheels. In this instance, the electric machine may drive on a front axle differential and further on the flanged shafts of the vehicle front axle which are guided with respect to the vehicle wheels via a single or double spur gear transmission stage.

In a generic drive apparatus, a rotor shaft of an electric machine is constructed as a hollow shaft with an internal tooth arrangement, in which a coaxial gear mechanism drive shaft with an external tooth arrangement is inserted, with a torque-transmitting spline being formed. The rotor shaft is guided outward through a bearing opening of the electric machine housing with a rotor shaft rotary bearing being interposed. In addition, the external tooth arrangement of the gear mechanism drive shaft is associated with a centering seat in order to prevent misalignment between the gear mechanism drive shaft and the rotor shaft. The centering seat is a circumferential smooth-cylindrical face which extends at the external circumference of the gear mechanism drive shaft and which is in abutment with the rotor shaft internal circumference with a tight clearance fit.

In the related art, the centering seat which is formed on the gear mechanism drive shaft is spaced apart from the rotor shaft rotary bearing in the axial direction by a lever arm length. It has been found that during travel operation with a rotating and radially loaded gear mechanism drive shaft, particularly as a result of the above-mentioned lever arm length, a shaft deflection occurs. Such a shaft deflection may lead to an excessively large loading of the rotor shaft rotary bearing, noise generation and a reduction of the service-life of the rotor shaft rotary bearing.

DE 23 54 301 A1 discloses a drive of a rail-bound electric traction vehicle. EP 1 433 975 B1 discloses a force transmission apparatus. DE 10 2010 050 217 A1 discloses an electric axle for a motor vehicle. US 2007/0131375 A1 discloses an electric steering apparatus.

SUMMARY

Described is a drive apparatus for a vehicle in which the gear mechanism drive shaft rotates in a structurally simple manner during travel operation with improved smooth running in comparison with the related art.

The description points out the fact that a shaft deflection of the gear mechanism drive shaft in the related art occurs primarily as a result of a lever arm length between the rotor shaft rotary bearing and the centering seat which is formed on the gear mechanism drive shaft. Against this background, to reduce the bending stress of the gear mechanism drive shaft, the centering seat thereof is arranged without any axial offset (that is to say, without any lever arm length) with respect to the rotor shaft rotary bearing and in axial alignment relative to the rotor shaft rotary bearing. Therefore, the lever arm length between the centering seat of the gear mechanism drive shaft and the rotor shaft rotary bearing is reduced to zero, whereby radial forces can be introduced in a direct force introduction (that is to say, without bending stress) by the gear mechanism drive shaft via the centering seat thereof into the rotor shaft rotary bearing. The deflection of the rotor shaft in the overlapping region of the two shafts may be limited.

To further reduce the shaft bending stress, the rotor shaft rotary bearing is not to be constructed as a fixed bearing, but instead as an axially displaceable, particularly a resiliently pretensioned floating bearing 10. The reduction of the deflection also functions when a fixed bearing is located in place of the floating bearing. The resilient pretensioning is for the defined loading of the roller members at any time so that there is no load-free state which would reduce the smooth running.

In a technical implementation, the external tooth arrangement which is formed on the gear mechanism drive shaft may be arranged offset with respect to the rotary bearing by an axial offset. The gear mechanism drive shaft may protrude with the electric machine-side shaft end face thereof into the rotor shaft. The centering seat may terminate directly at the electric machine-side shaft end face. In this manner, the largest possible axial spacing between the centering seat and a bearing seat (which will be described below) of the gear mechanism drive shaft may be achieved, which limits the deflection of the rotor shaft in the overlapping region of the two shafts. The centering seat which may be arranged directly on the electric machine-side shaft end face can initially merge in the direction toward a gear-side shaft end face into a shaft portion which has a reduced diameter. In the further axial path, the shaft portion which has a reduced diameter may be adjoined by the external tooth arrangement which has a larger diameter.

In a technical implementation, the gear mechanism drive shaft may be rotatably supported in a gear mechanism housing with a gear mechanism rotary bearing being interposed. The gear mechanism housing rotary bearing is located on a corresponding bearing seat of the gear mechanism drive shaft. The bearing seat of the gear mechanism drive shaft may be arranged directly on the gear-side shaft end face, whereby the largest possible axial spacing between the bearing seat and the centering seat of the gear mechanism drive shaft is provided.

The gear mechanism drive shaft and the rotor shaft may form a shaft assembly which is rotatably supported as a whole in a three-point bearing in the drive apparatus. The three-point bearing may include, at the two shaft assembly, end faces bearing locations on which the shaft assembly is rotatably supported by a fixed bearing on the electric machine housing and on the gear mechanism housing, whilst at the shaft assembly center the rotor shaft rotary bearing may be positioned as a central floating bearing. In comparison with conventional four-point bearings, such a three-point bearing involves significantly lower costs and reduced production complexity.

The rotor shaft may be a component of a rotor inner cooling system, in which a tubular oil lance protrudes into the hollow space of the rotor shaft. The oil lance may delimit an annular gap together with the rotor shaft internal circumference. During travel operation, a lubricant and/or coolant volume flow can be guided by a pressure pump through the oil lance at an overflow opening into the annular gap. From there, the lubricant and/or coolant volume flow can be guided further in the direction toward the centering seat of the gear mechanism drive shaft. In this instance, the centering seat of the gear mechanism drive shaft may have an axial flow passage. The shaft portion of the gear mechanism drive shaft which has a reduced diameter together with the rotor shaft internal circumference may delimit an axial flow groove. In this manner, the annular gap may be connected to the spline in technical flow terms via the centering seat flow passage and via the axial flow groove. As a result of the tooth arrangement play, a small volume flow of lubricant and/or coolant can flow through the spline in order to ensure the discharge of fretting corrosion particles.

The gear mechanism drive shaft may be in form of a hollow shaft. In order to produce the gear mechanism drive shaft, a shaft blank made from a hardenable steel may first be provided. Both the centering seat and the bearing seat may already be formed in the shaft blank. Subsequently, there a thermal processing may be carried out in which the shaft blank is hardened, with component distortion with corresponding shaft deflection. In order to minimize the component distortion, there may be an orientation process in which the hardened shaft blank is clamped by clamping tools at two axially spaced-apart clamping locations. In the clamped state, the shaft blank is plastically deformed with a process force in order to reduce the component distortion. The process force engages between the two clamping locations which are axially spaced apart from each other.

With regard to a correct orientation of the shaft blank, the two clamping locations which are axially spaced apart from each other may be spaced apart from each other by the largest possible axial spacing. Against this background, the two clamping locations may be the bearing and centering seats which are formed on the shaft end faces of the gear mechanism drive shaft.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Figure 1:
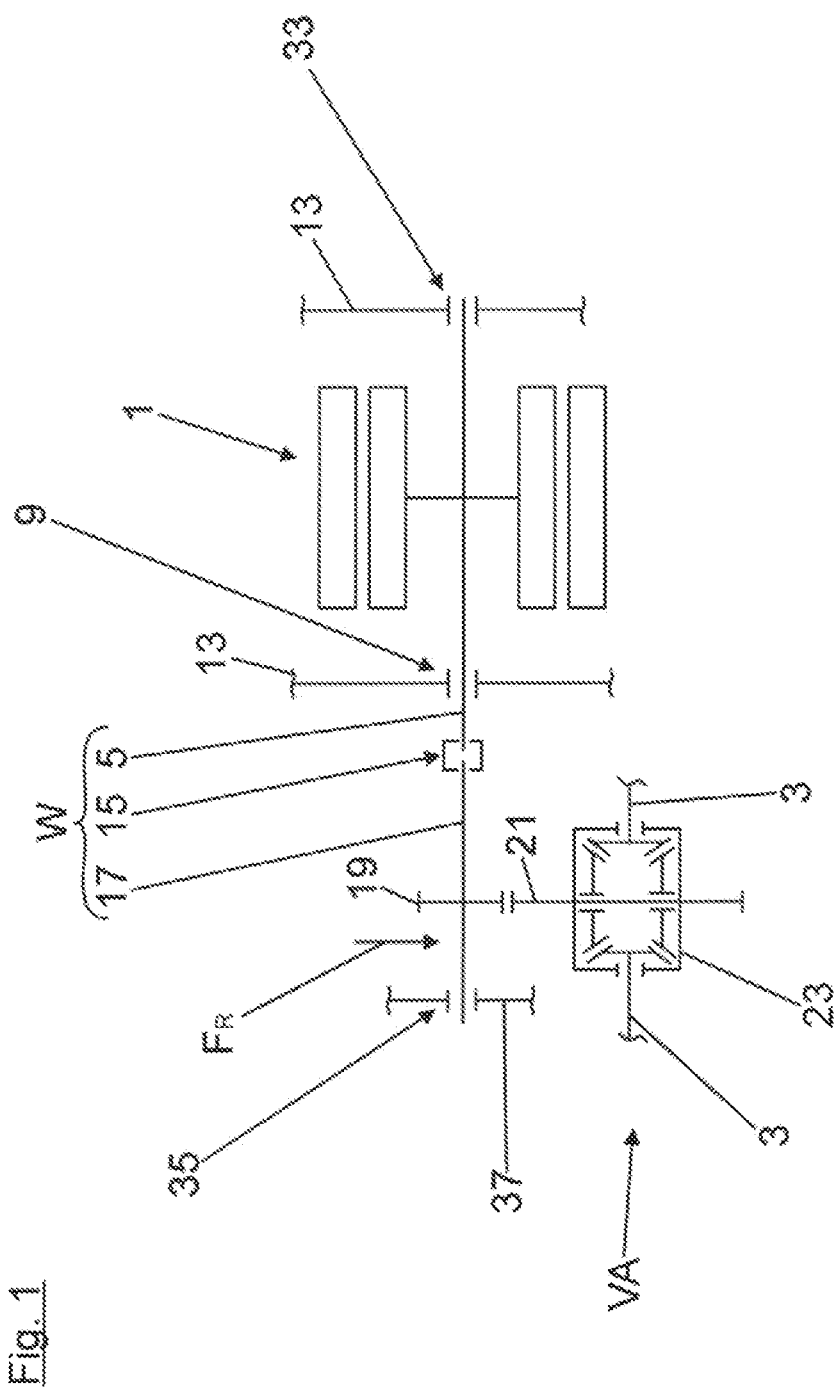
FIG. 1 shows a gear mechanism structure of a drive apparatus.
Figure 3:
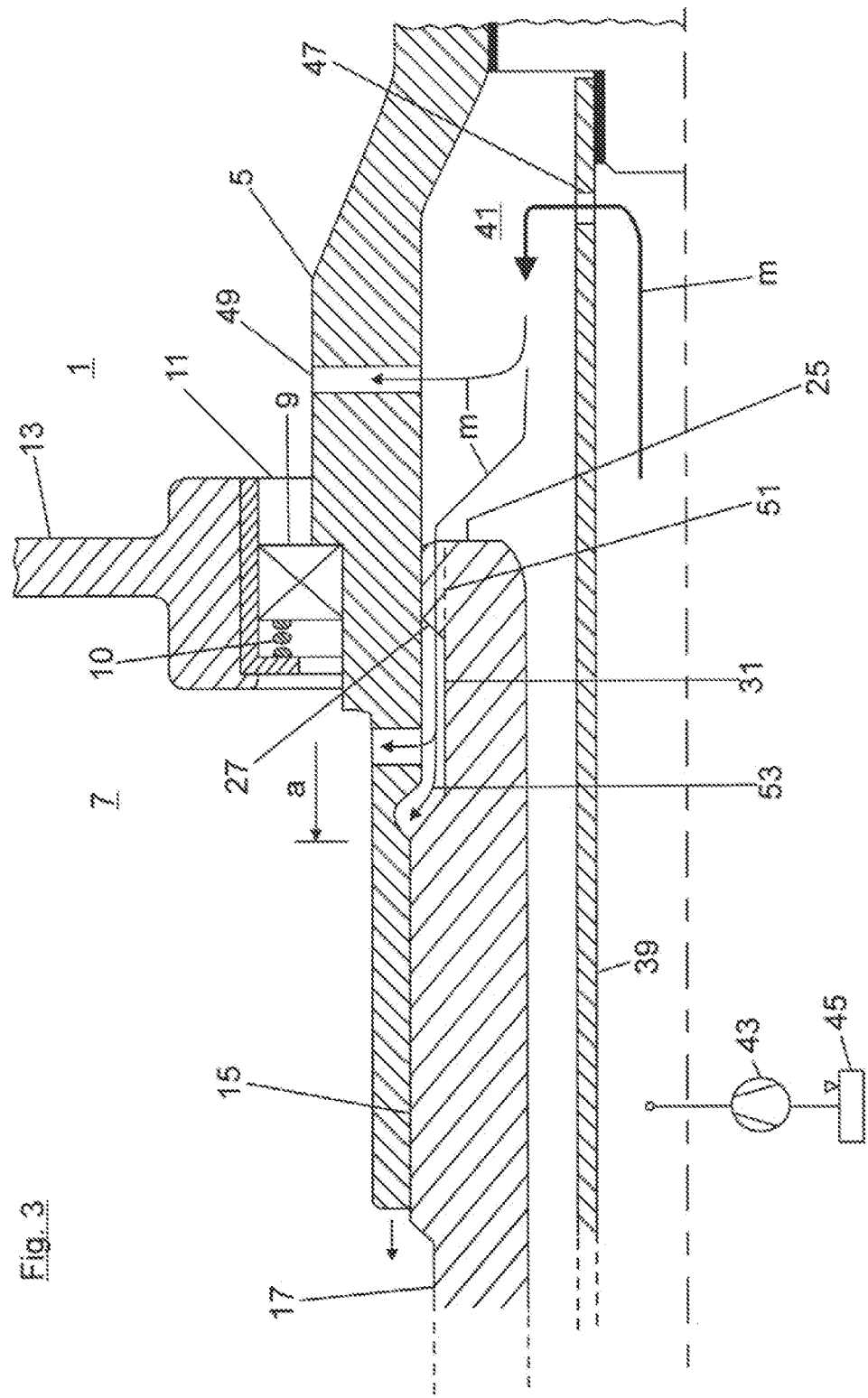
FIG. 3 is a view according to FIG. 1 according to an example.

FIG. 1 shows a drive apparatus in which the front axle VA of a two-track vehicle can be driven. The front axle VA has an electric machine 1 which is arranged axially parallel with the flanged shafts 3 which are guided relative to the vehicle wheels. The rotor shaft 5 of the electric machine 1 is drivingly connected to the two flanged shafts 3 by a gear mechanism 7 (FIG. 3). With a rotor shaft rotary bearing 9 (FIG. 1 or 3) being interposed, the rotor shaft 5 is guided outward out of a bearing opening 11 of an electric machine housing 13 and connected by a torque-transmitting spline 15 to a coaxially arranged gear mechanism drive shaft 17. On the gear mechanism drive shaft 17 there is arranged a fixed gear 19 of a gear stage St1 of the gear mechanism 7 which meshes with an input-side gear 21 of an axle differential 23. The axle differential 23 drives at both sides on the flanged shafts 3 which are guided with respect to the vehicle wheels.

A known shaft assembly according to FIG. 2 will first be described. Consequently, the rotor shaft 5 is constructed as a hollow shaft with an internal tooth arrangement, in which the gear mechanism drive shaft 17 which is coaxial relative thereto and which has an external tooth arrangement 16 (FIG. 4) is inserted, whereby the spline 19 is produced. According to FIG. 2, the gear mechanism drive shaft 17 with the electric machine-side shaft end face 25 thereof protrudes into the rotor shaft 5. There terminates directly at the electric machine-side shaft end face 25, a centering seat 27 which has a circumferential smooth-cylindrical surface which is in a tight clearance fit with the rotor shaft internal circumference which is also smooth-cylindrical.

The centering seat 27 merges in the direction toward a gear-side shaft end face 29 (FIG. 5) into a shaft portion 31 of the gear mechanism drive shaft 17 of reduced diameter which is adjoined in the further axial path by the external tooth arrangement 16 which has a larger diameter. In the related art FIG. 2, the centering seat 27 formed on the gear mechanism drive shaft 17 is spaced apart from the rotor shaft rotary bearing 9 by a lever arm length h. It has been found that, during travel operation, with a rotating gear mechanism drive shaft 17 and when a radial force $F_R$ acts on the gear mechanism drive shaft 17 as a result of the lever arm length h a shaft deflection D (FIG. 2) which leads to an excessively large loading of the rotor shaft rotary bearing 9 and to noise generation is produced.

Figure 2:
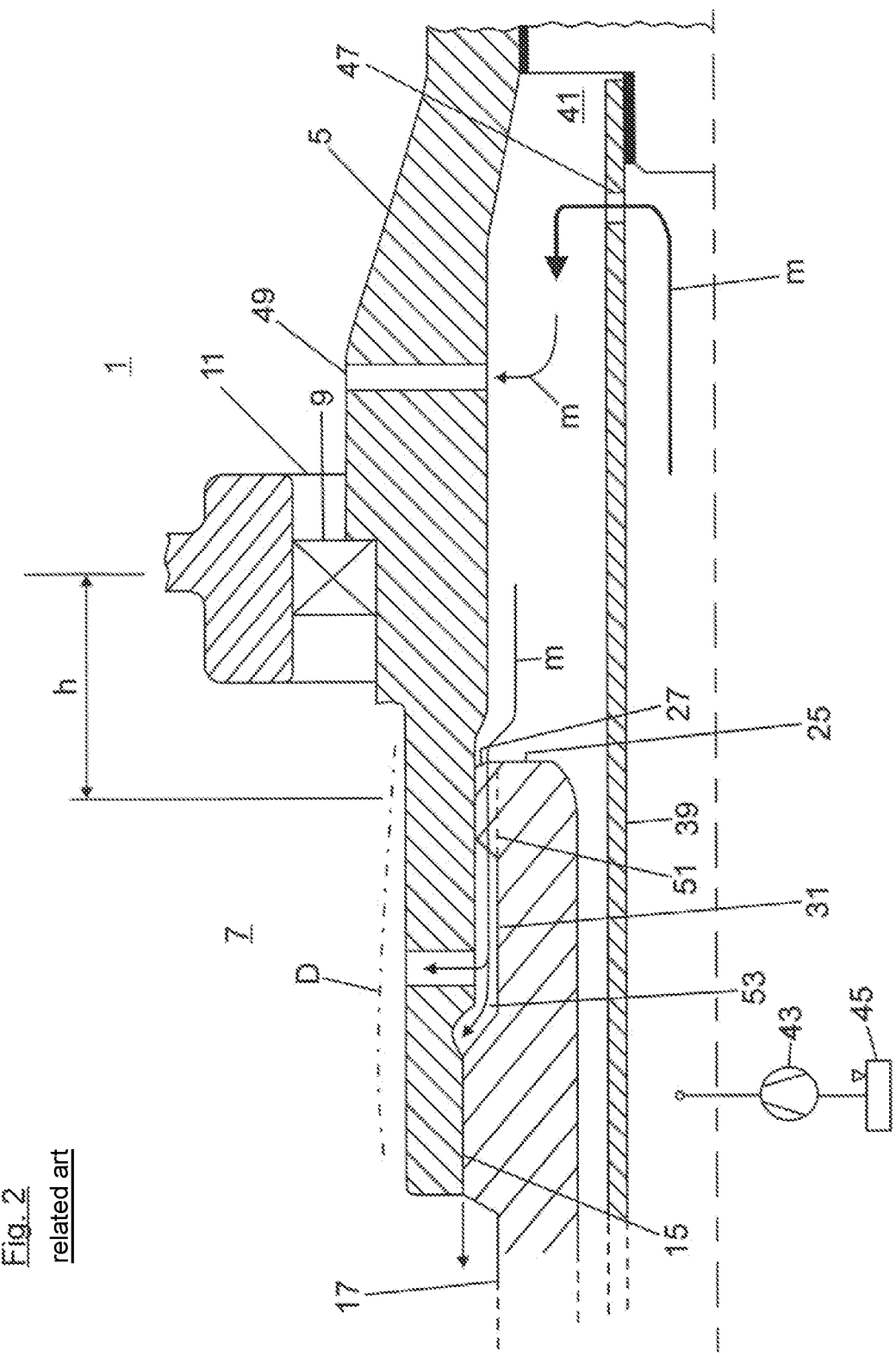
FIG. 2 is a half-sectioned partial view of a shaft assembly including the gear mechanism drive shaft and rotor shaft according to a comparative form in the related art.

Against this background, in order to reduce a shaft deflection D the following measures are taken in FIG. 3: in contrast to FIG. 2, in FIG. 3 the centering seat 27 of the gear mechanism drive shaft 17 is no longer spaced apart from the rotor shaft rotary bearing 9 by a lever arm length h, but instead arranged without any axial offset and in axial alignment with respect to the rotor shaft rotary bearing 9. The bending stress of the gear mechanism drive shaft 17 is thereby reduced. In addition, the rotor shaft rotary bearing 9 may be in form of an axially displaceable, resiliently pre-tensioned floating bearing 10.

The gear mechanism drive shaft 17 and the rotor shaft 5 form a shaft assembly W (FIG. 1) which is rotatably supported in a structurally simplified three-point bearing in the drive apparatus, at both shaft assembly end faces by a fixed bearing 33 on the electric machine housing and by an additional fixed bearing 35 on the gear mechanism housing 37, respectively. The rotor shaft rotary bearing 9 which is in the form of a floating bearing is located at the shaft assembly center.

As can further be seen in FIG. 3, there protrudes into the hollow space of the rotor shaft 5 a tubular oil lance 39 which is a component of a rotor inner cooling. The oil lance 39 delimits together with the rotor shaft internal circumference an annular gap 41. When the rotor inner cooling is activated, a pressure pump 43 conveys a lubricant and/or coolant volume flow m from a pump sump 45 through the oil lance 39 and via the overflow opening 47 thereof into the annular gap 41. From the annular gap 41, the lubricant and/or coolant volume flow m is conveyed via an outlet opening 49 of the rotor shaft 5 into the electric machine inner space. Furthermore, the lubricant and/or coolant volume flow m is conveyed via a flow passage 51 which is formed in the centering seat 27 and via an axial flow groove 53 as far as the spline 15. The axial flow groove 53 is delimited between the shaft portion 31 which has a reduced diameter and the rotor shaft internal circumference.

Figure 4:
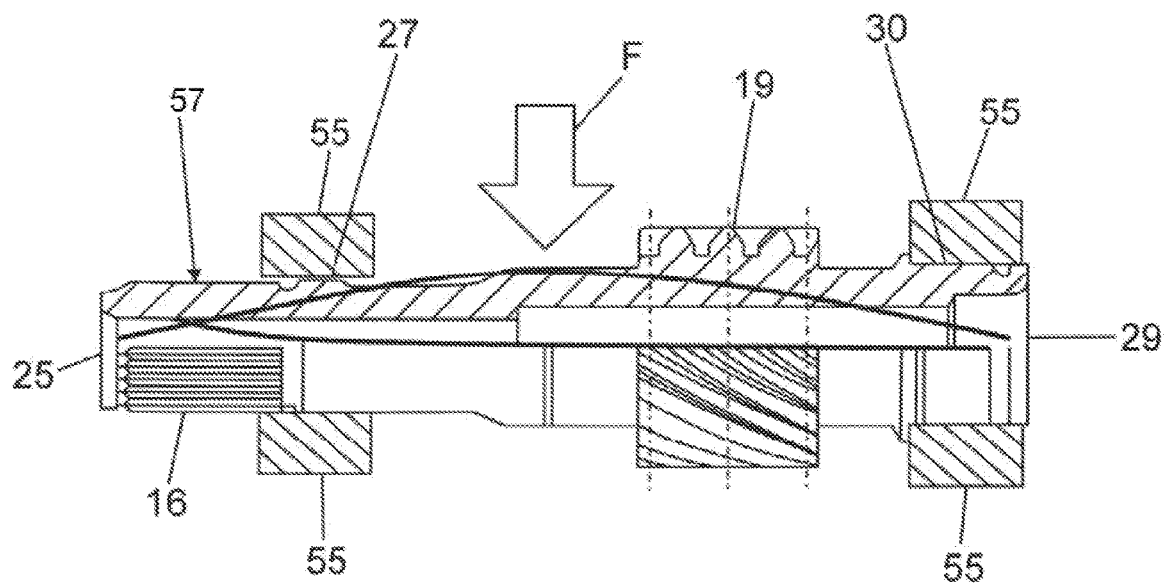
FIG. 4 shows an orientation station in which a gear mechanism drive shaft is clamped according to a comparative form in the related.

A process sequence for producing the gear mechanism drive shaft 17 will be described below with reference to FIGS. 4 and 5: accordingly, a shaft blank 57 made from a hardenable steel is first provided. The shaft blank 57 has both the centering seat 27 and the bearing seat 30. The bearing seat 30 is arranged in FIGS. 4 and 5 directly on the gear-side shaft end face 29 of the gear mechanism drive shaft 17.

The shaft blank 57 is subsequently hardened in a thermal processing, with component distortion, whereby a shaft deflection D is produced. The shaft deflection D is depicted in FIGS. 4 and 5 by of the illustrated bending lines. In a subsequent orientation process, the shaft blank 57 is clamped by clamping tools 55 at two clamping locations which are axially spaced apart from each other and plastically deformed with a process force F until the component distortion is reduced. The greater the spacing between the two clamping locations is, the simpler it is to reduce the component distortion (and the shaft deflection involved). Against this background, in FIG. 5 the two clamping locations are the bearing and centering seats 27, 30 formed at the electric machine-side and gear-side shaft end faces 25, 29, respectively. In this manner, in FIG. 5, the two clamping locations are spaced apart from each other by the greatest possible axial spacing.

Figure 5:
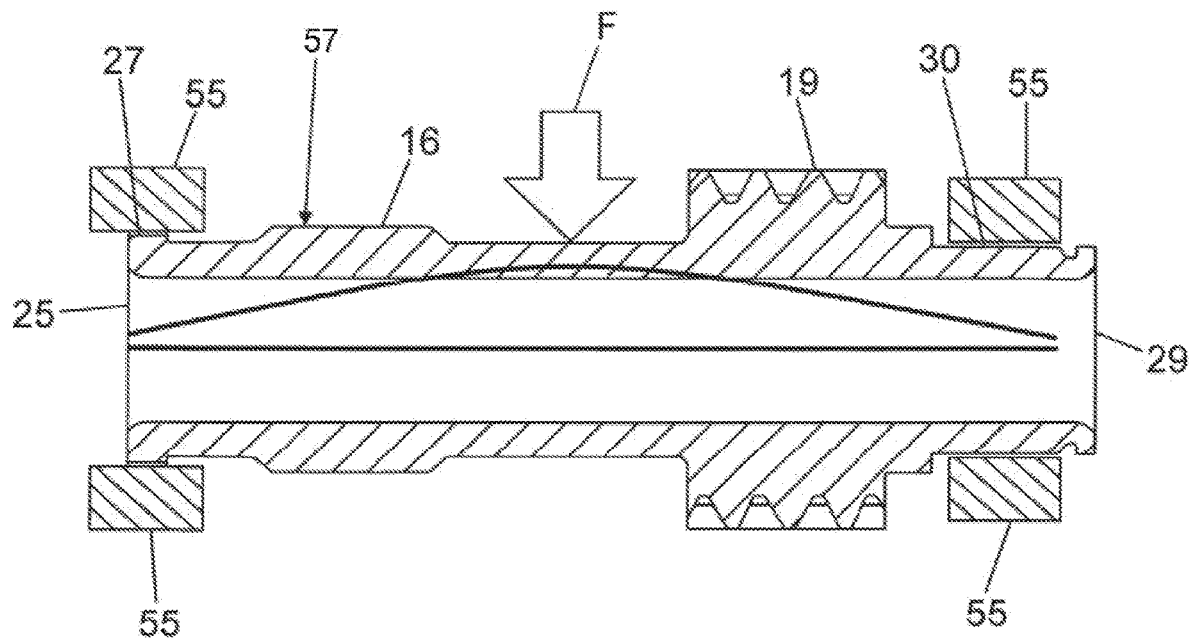
FIG. 5 is a view according to FIG. 4 according to an example.

In contrast, in the example shown in FIG. 5 the centering seat 27 of the gear mechanism drive shaft 17 is not formed directly on the electric machine-side shaft end face 25, but instead positioned in a manner offset from the electric machine-side shaft end face 25 by an axial offset a. In this manner, the electric machine-side shaft end face 25 protrudes into the rotor shaft 5 with an overhang over the clamping location (on the left in FIG. 5), whereby even after carrying out the orientation process, a component distortion remains in the gear mechanism drive shaft 17.

LIST OF REFERENCE NUMERALS

1 Electric machine
3 Flanged shafts
5 Rotor shaft
7 Gear mechanism
St1 Gear stage
9 Rotor shaft rotary bearing
10 Pretensionied spring
11 Bearing opening
13 Electric machine housing
15 Spline
17 Gear mechanism drive shaft
19 Fixed gear
21 Input-side gear
23 Axle differential
25 Electric machine-side shaft end face
27 Centering seat
29 Gear-side shaft end face
30 Bearing seat
31 Shaft portion with reduced diameter
33 Fixed bearing
35 Fixed bearing
37 Gear mechanism housing
39 Oil lance
41 Annular gap
43 Pressure pump
45 Pump sump
47 Overflow opening
49 Outlet opening
51 Centering seat flow passage
53 Axial flow groove
55 Clamping tool
57 Shaft blank
D Shaft deflection
W Shaft assembly
h Lever arm length
a Axial offset
F Process force
$F_R$ Radial force
m Coolant volume flow A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A drive apparatus for a vehicle having an electric machine including a rotor shaft constructed as a hollow shaft having an internal tooth arrangement, the drive apparatus comprising:
 a gear mechanism drive shaft, which has an external tooth arrangement, is inserted coaxially relative to the hollow shaft into the hollow shaft, to form a torque-transmitting spline,
 the rotor shaft with a rotor shaft rotary bearing being interposed is guided outward through a bearing opening of a housing for the electric machine,
 the gear mechanism drive shaft has a centering seat which is in abutment with an internal circumference of the rotor shaft with a tight clearance fit, the gear mechanism drive shaft subjected to a bending (D) stress during travel operation as a result of radially active operating forces ($F_R$),
 the centering seat of the gear mechanism drive shaft arranged without an axial offset with respect to the rotor shaft rotary bearing and in axial alignment relative to the rotor shaft rotary bearing, resulting in reducing the bending (D) stress of the gear mechanism drive shaft.

2. The drive apparatus according to claim 1, wherein the rotor shaft rotary bearing is a pretensioned floating bearing to be axially displaceable, resulting in further reducing the bending (D) stress of the gear mechanism drive shaft.

3. The drive apparatus according to claim 2, wherein the external tooth arrangement formed on the gear mechanism drive shaft is arranged offset with respect to the rotor shaft rotary bearing by the axial offset.

4. The drive apparatus according to claim 2, wherein the gear mechanism drive shaft protrudes with an electric machine-side shaft end face thereof into the rotor shaft, and
 the centering seat terminates directly without the external tooth arrangement being interposed, at the electric machine-side shaft end face, and/or the centering seat merges in a direction towards a gear-side shaft end face into a shaft portion of the gear mechanism drive shaft which has a reduced diameter and in a further axial path into the external tooth arrangement which has a larger diameter.

5. The drive apparatus according to claim 2 wherein the gear mechanism drive shaft is rotatably supported in a gear mechanism housing with a gear mechanism rotary bearing being interposed, in a fixed bearing, and a bearing seat of gear mechanism drive shaft which is associated with the gear mechanism rotary bearing terminates directly without a tooth arrangement or another functional portion being interposed, at gear-side shaft end face.

6. A method of producing a gear mechanism drive shaft for a drive apparatus according to claim 2, the method comprising:
hardening a shaft blank made from a hardenable steel;
forming both the centering seat and a bearing seat,
the shaft blank is hardened in a thermal processing, with component distortion, with shaft deflection and in a following orientation; and
the shaft blank is clamped by clamping tools at two axially spaced-apart clamping locations and is plastically deformed with a process force (F) to reduce the component distortion, the two axially spaced-apart clamping locations correspond to the bearing seat and the centering seat formed on electric machine-side shaft end faces.

7. The drive apparatus according to claim 1, wherein the external tooth arrangement formed on the gear mechanism drive shaft is arranged offset with respect to the rotor shaft rotary bearing by the axial offset.

8. The drive apparatus according to claim 7, wherein the gear mechanism drive shaft protrudes with an electric machine-side shaft end face thereof into the rotor shaft, and
the centering seat terminates directly without the external tooth arrangement being interposed, at the electric machine-side shaft end face, and/or
the centering seat merges in a direction towards a gear-side shaft end face into a shaft portion of the gear mechanism drive shaft which has a reduced diameter and in a further axial path into the external tooth arrangement which has a larger diameter.

9. The drive apparatus according to claim 7, wherein a tubular oil lance protrudes into a hollow space of the rotor shaft, the tubular oil lance being a component of a rotor inner cooling and delimits an annular gap together with a rotor shaft internal circumference, so that a lubricant and/or coolant volume flow can be guided through the tubular oil lance via an overflow opening into the annular gap.

10. The drive apparatus according to claim 1, wherein
the gear mechanism drive shaft protrudes with an electric machine-side shaft end face thereof into the rotor shaft, and
the centering seat terminates directly without the external tooth arrangement being interposed, at the electric machine-side shaft end face, and/or
the centering seat merges in a direction towards a gear-side shaft end face into a shaft portion of the gear mechanism drive shaft which has a reduced diameter and in a further axial path into the external tooth arrangement which has a larger diameter.

11. The drive apparatus according to claim 1 wherein the gear mechanism drive shaft is rotatably supported in a gear mechanism housing with a gear mechanism rotary bearing being interposed, in a fixed bearing, and a bearing seat of the gear mechanism drive shaft which is associated with the gear mechanism rotary bearing terminates directly without a tooth arrangement or another functional portion being interposed, at a gear-side shaft end face.

12. The drive apparatus according to claim 1, wherein a tubular oil lance protrudes into a hollow space of the rotor shaft, the tubular oil lance being a component of a rotor inner cooling and delimits an annular gap together with a rotor shaft internal circumference, so that a lubricant and/or coolant volume flow can be guided through the tubular oil lance via an overflow opening into the annular gap.

13. The drive apparatus according to claim 12, wherein the centering seat of the gear mechanism drive shaft includes an axial flow passage and shaft portion of the gear mechanism drive shaft, which has a reduced diameter, together with the rotor shaft internal circumference delimits an axial flow groove so that the annular gap is connected in terms of flow to a torque-transmitting spline through the axial flow passage which is formed in the centering seat and through the axial flow groove.

14. A method of producing a gear mechanism drive shaft for a drive apparatus according to claim 1, the method comprising:
hardening a shaft blank made from a hardenable steel; and
forming both the centering seat and a bearing seat,
the shaft blank is hardened in a thermal processing, with component distortion, with shaft deflection and in a following orientation; and
the shaft blank is clamped by clamping tools at two axially spaced-apart clamping locations and is plastically deformed with a process force (F) to reduce the component distortion, the two axially spaced-apart clamping locations correspond to the bearing seat and the centering seat formed on electric machine-side shaft end faces.

15. The drive apparatus according to claim 1, wherein the gear mechanism drive shaft and the rotor shaft form a shaft assembly which is rotatably supported in a three-point bearing in the drive apparatus at shaft assembly end faces, by a fixed bearing on an electric machine housing and on a gear mechanism housing and at a shaft assembly center by a central floating bearing, respectively.

* * * * *

UNITED STATES PATENT AND TRADEMARK OFFICE
CERTIFICATE OF CORRECTION

| | | |
|---|---|---|
| PATENT NO. | : 11,971,094 B2 | Page 1 of 1 |
| APPLICATION NO. | : 17/781525 | |
| DATED | : April 30, 2024 | |
| INVENTOR(S) | : Markus Schaefer | |

It is certified that error appears in the above-identified patent and that said Letters Patent is hereby corrected as shown below:

In the Claims

Column 7, Line 10:
In Claim 5, delete "gear" and insert --the gear--.

Signed and Sealed this
Second Day of July, 2024

Katherine Kelly Vidal
*Director of the United States Patent and Trademark Office*